US007047500B2

(12) United States Patent
Roelofs

(10) Patent No.: US 7,047,500 B2
(45) Date of Patent: May 16, 2006

(54) DYNAMICALLY CONFIGURABLE VIRTUAL WINDOW MANAGER

(75) Inventor: Gregory Robert Roelofs, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 546 days.

(21) Appl. No.: 09/991,141

(22) Filed: Nov. 16, 2001

(65) Prior Publication Data
US 2003/0095146 A1 May 22, 2003

(51) Int. Cl.
*G09G 5/00* (2006.01)
(52) U.S. Cl. .................. 715/779; 715/764; 715/778
(58) Field of Classification Search ........ 345/741–743, 345/764–767, 778–779, 781, 788, 848–852, 345/801–802, 700, 961, 797, 794, 783
See application file for complete search history.

(56) References Cited

U.S. PATENT DOCUMENTS

| 5,463,726 A | * | 10/1995 | Price ........................ 345/797 |
| 5,499,334 A | * | 3/1996 | Staab ....................... 345/778 |
| 5,564,002 A | * | 10/1996 | Brown ...................... 345/778 |
| 5,742,285 A | * | 4/1998 | Ueda ........................ 345/778 |
| 5,745,109 A | * | 4/1998 | Nakano et al. ............. 345/838 |
| 5,841,435 A | * | 11/1998 | Dauerer et al. ............ 345/775 |
| 5,872,872 A | * | 2/1999 | Kajiwara ................... 382/296 |
| 6,204,845 B1 | * | 3/2001 | Bates et al. ................ 345/788 |
| 6,710,790 B1 | * | 3/2004 | Fagioli ...................... 345/802 |

OTHER PUBLICATIONS

Copending U.S. Appl. No. 09/724,656, filed Nov. 28, 2000, Roelofs.

* cited by examiner

*Primary Examiner*—Kristine Kincaid
*Assistant Examiner*—Thanh Vu

(57) ABSTRACT

A virtual window manager having a substantially unconstrained active area is provided for managing windows and icon objects. The user is provided options for "carving out" regions of this unconstrained area for placing objects. The carved out regions, or "tunnels", provide the user with a path for subsequently navigating back to each placed object. These tunnels are of arbitrary shape and size, at the user's discretion, as are the shapes of the placed objects. Using the analogy of tunnels, access control can be embodied in the size or shape of each tunnel, wherein individual users possess different spelunking capabilities. Using different colors or textures to distinguish the carved out regions from the undisturbed active areas, the display of select areas can provide for visually interesting effects, and allows for the creative presentation of windows and icons on a user's computer system. Because the user is provided the option of carving out regions as required for placing objects in a limitless active area, the conventional technique of stacking objects within a limited area can be avoided.

24 Claims, 2 Drawing Sheets

DYNAMICALLY CONFIGURABLE VIRTUAL WINDOW MANAGER

BACKGROUND OF THE INVENTION

1. Field of the Invention

This invention relates to the field of computer systems, and in particular to a virtual window manager having an active area that is dynamically configurable.

2. Description of Related Art

Conventional virtual window managers provide an active area, or "virtual desktop", corresponding to a display layout that is larger than the display area of a computer display device. The active area accommodates windows of currently active applications, icons, and control items, hereinafter termed "objects". Controls are provided to allow the user to locate the display area relative to the active area. Objects in the active area that are also located within the display area in the active area are presented on the display device, based on a mapping of the display area to the locations of the objects in the active area. In this manner, the user is able to view the entire active area, via a movement of the smaller display area relative to the larger active area.

Conventionally, the size and shape of the active area is fixed at startup, and cannot be dynamically changed. If a user runs out of room in the fixed active area, the user generally places windows atop each other, as one stacks papers and books on a physical desktop. This analogy of stacked items on a physical desktop is the basis of the term "virtual desktop". Consistent with this analogy, and for ease of processing and display, conventional windows, display areas, and active areas are constrained to be substantially rectangular.

Manufacturers and vendors of computer systems are continually searching for features that provide for "product differentiation", features that will distinguish one's product from a competitor's product. The virtual window manager is often the first feature that a consumer sees when viewing a new computer system, or a new operating system, or a new windows management application. The routine use of rectangular display objects and structures, however, has produced a relatively limited, and somewhat boring, set of display options. Most attempts at distinguishing one's product from others via the window manager involve creative use of colors and fonts, background images, or animated cursors and menus.

As computer systems become ubiquitous, users of these systems can be expected to become dissatisfied by the limited set of options for organizing and displaying objects on their computer screens. Artistic and creative users can be expected to welcome a window manager that does not, in fact, look like a desktop with stacks of books or papers.

BRIEF SUMMARY OF THE INVENTION

It is an object of this invention to provide a new and useful paradigm for managing virtual windows that allows for a dynamic reconfiguration of the active area of the virtual window manager. It is a further object of this invention to provide a virtual window manager having an arbitrarily shaped and reconfigurable active area of arbitrary extent. It is a further object of this invention to provide a virtual window manager that provides a distinguishable user interface.

These objects and others are achieved by providing a virtual window manager having a substantially unconstrained active area. The user is provided options for "carving out" regions of this "limitless" area for placing objects. The carved out regions, or "tunnels", provide the user with a path for subsequently navigating back to each placed object. These tunnels are of arbitrary shape and size, at the user's discretion, as are the shapes of the placed objects. Using the analogy of tunnels, access control can be embodied in the size or shape of each tunnel, wherein individual users possess different spelunking capabilities. Using different colors or textures to distinguish the carved out regions from the undisturbed active areas, the display of select areas can provide for visually interesting effects, and allows for the creative presentation of windows and icons on a user's computer system. Because the user is provided the option of carving out regions as required for placing objects in a limitless active area, the conventional technique of stacking objects within a limited area can be avoided.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
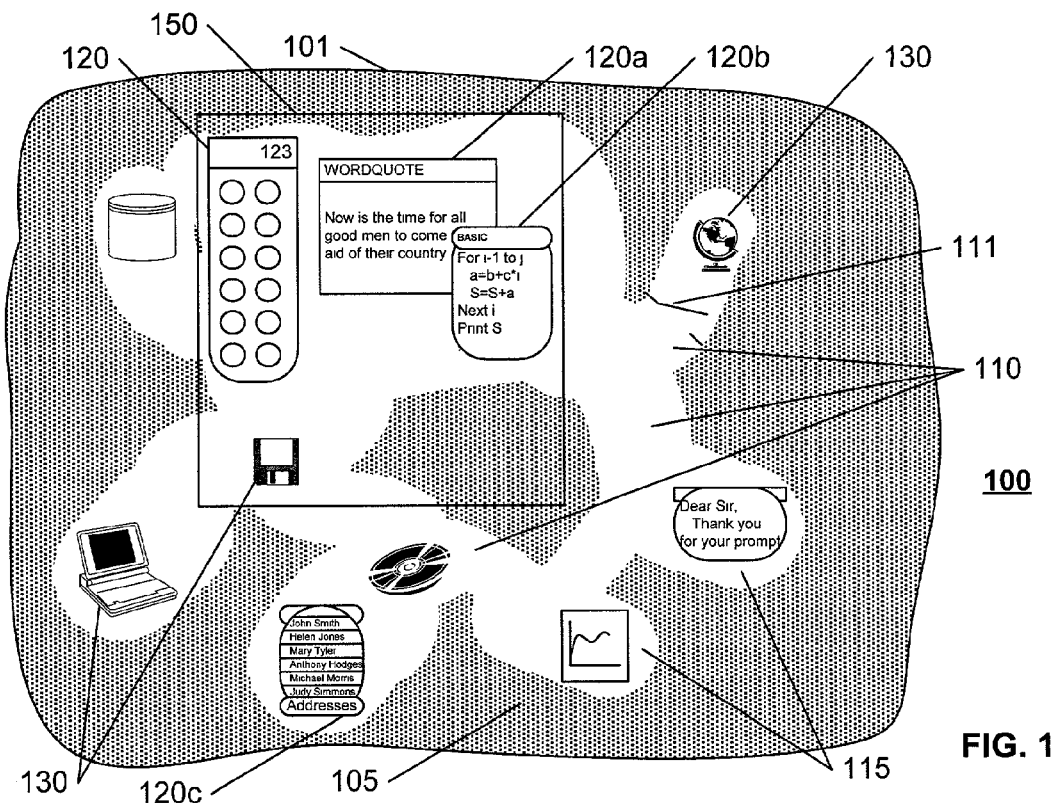
FIG. 1 illustrates an example of an arbitrarily shaped active area with carved out regions for placing objects in a virtual window manager in accordance with this invention.

FIG. 1 illustrates an example of an arbitrarily shaped active area 100 with carved out regions 110 for placing objects 120, 130 in a virtual window manager in accordance with this invention. The active area 100 is illustrated as having a boundary 101, for illustrative purposes. In accordance with this invention, the boundary 101 does not, per se, exist, because the area 100 extends as far as the user needs it to extend. That is, as contrast to conventional window managers that are bounded by a fixed extent in each direction, and do not allow access to, or viewing of, portions of windows or other objects that are placed beyond these extents, the window manager of this invention allows objects to placed, and subsequently viewed and accessed 'anywhere', regardless of an original boundary 101.

In a preferred embodiment of this invention, the active area 100 is analogous to a bulk of solid material, and the user is provided tools for "carving out" tunnels 110 within this solid material, or blocking regions, creating caverns 115 and the like for placing the objects 120, 130.

Illustrated in FIG. 1 is a display area 150 that encompasses a section of the active area 100. This display area 150 defines the section of the active area 100 that is rendered to a display device (200 in FIG. 2). As in a conventional system, the shape of the display area 150 preferably corresponds to the shape of the screen in the display device, and the size of the region that it encompasses depends upon a selected scale, or resolution, of the display device 200 relative to the active area 100. Also as in a conventional system, the user of the system is provided controls that facilitate the movement of the display area 150 relative to the active area 100. As noted above, the boundary 101 exists for illustrative purposes; in accordance with this invention, the display area 150 can be placed 'anywhere' and will still be in the active area 100. Because the display area 150 may be moved anywhere within an unbounded active area 100, disorientation may occur, and the system preferably also includes a 'reset' or 'home' control that resets the display area 150 to a predetermined location in the active area 100, or other tools that facilitate navigation through an unbounded active area 100. In a preferred embodiment, a scaled-down (zoomed-out) representation of the active area 100 is available for presentation in the display area 150, to further facilitate navigation by indicating where in the active area 100 the current display area 150 is located.

Figure 2:
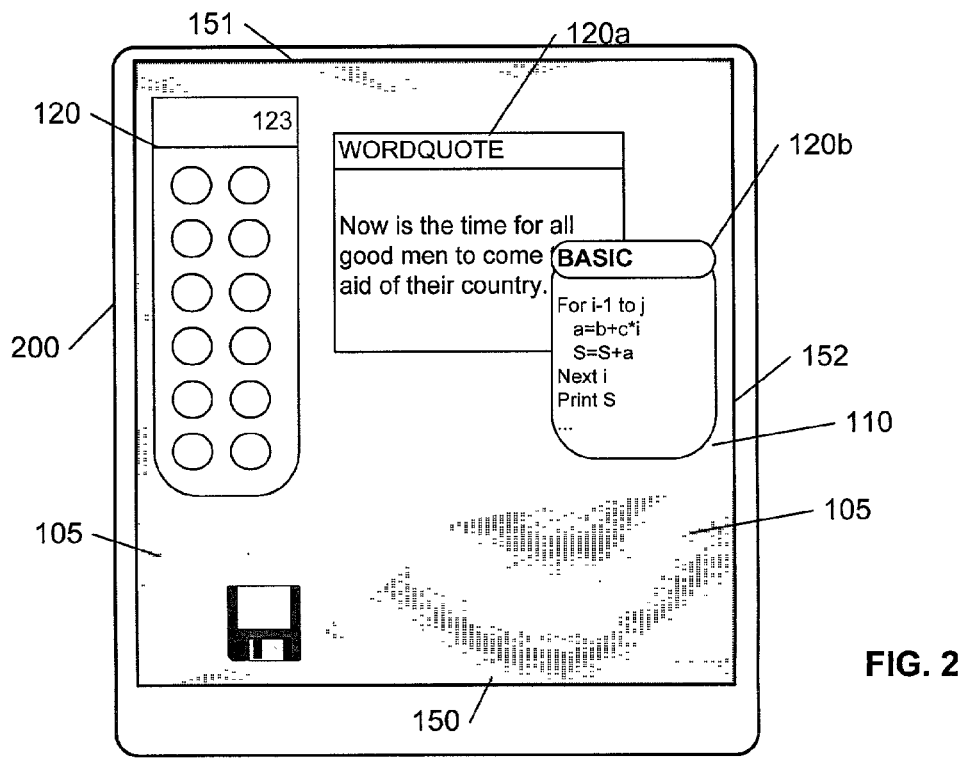
FIG. 2 illustrates an example of a computer system display that is rendering a select display area of the active area corresponding to FIG. 1 in accordance with this invention.

FIG. 2 illustrates an example of a computer system display 200 that is rendering the select display area 150 of the active area 100 corresponding to FIG. 1 in accordance with this invention. As can be seen, the presence of carved out regions 110 from a background 105 of the active area present a display image that differs substantially from a conventional window management system's display of a rectangular active area. In like manner the overall structure of the tunnels 110 that are carved out of a solid active area 100 in FIG. 1 provide a novel means for organizing objects 120, 130 within the windows management system, compared to the conventional scheme of arrayed icons and stacked windows within a rectangular active area.

In accordance with a preferred embodiment of this invention, the user is provided the option of automatically carving out regions 110, 115 of the active area 100 by merely moving an object 120, 130 into the solid areas of the active area 100. Using this option, for example, when the user moves an object 120, 130 against an edge 151 of the display area 150, using conventional "drag" techniques, or other movement control, the display area 150 is shifted, as if the object 120, 130 pushes against the edge 151 and causes the display area 150 to move in the direction of the 'push'. As the object 120, 130 is moved into the solid regions 105 of the active area, tunnels 110 are carved out of the solid regions to accommodate the object 120, 130. To further provide for artistry, the width of the tunnels 110 are also controllable by the user, so that, for example, the movement of an object 120, 130 creates a narrow tunnel, and the 'dropping' of the object 120, 130 at a select location creates a cavern that is large enough to contain the object 120, 130.

In a preferred embodiment of this invention, the user is also provided the option of selecting between a "mining" mode, and a "spelunking" mode. The mining mode allows the user to create or modify tunnels and caverns, as discussed above. In the spelunking mode, consistent with the analogy of tunnels and caverns, the user is constrained to travel only along existing tunnels 110, and to store objects 120, 130 only in existing caverns 115. In a less constrained spelunking mode, the user's travel is not constrained, but the storage of objects 120, 130 are constrained to existing caverns 115. In this manner, a created network of tunnels 110 and caverns 115 is not unintentionally altered by a mere movement of an object 120, 130. A preferred embodiment of this invention also provides a means of "locking" the window manager in the spelunking mode, thereby limiting access to the mining mode. This option is particularly well suited for system providers who create distinctive patterns of tunnels 110 and caverns 115, and wish to use such patterns to distinguish their product, or to identify the source of the product, akin to trademarking the product. Additionally, this option can be used as a security device, wherein a user in the mining mode can remove access paths to select objects by 'filling in' existing tunnels, and only a user with 'mining rights' in that region of the active area will be able to subsequently gain access to these objects. One of ordinary skill in the art will readily appreciate that a variety of interesting rules and scenarios can be developed around this 'tunnel' analogy, including the possibility of enabling three-dimensional mining and navigating, defining direction-dependent navigating capabilities ('up' being more difficult than 'down'), creation of pits or doors, or a door/roof system, or other portals 111 to particular regions, that prevent unauthorized navigation, and optionally visibility, of the active area, and so on.

To further enhance the artistic design options, a preferred embodiment of this invention allows conventional rectangular windows 120*a*, as well as non-rectangular windows 120*b*, 120*c*. The non-rectangular windows may be designed by the provider of the application, or, the user may configure each application, or class of applications, or particular data set, to default to a predefined or custom-designed shape.

Figure 3:
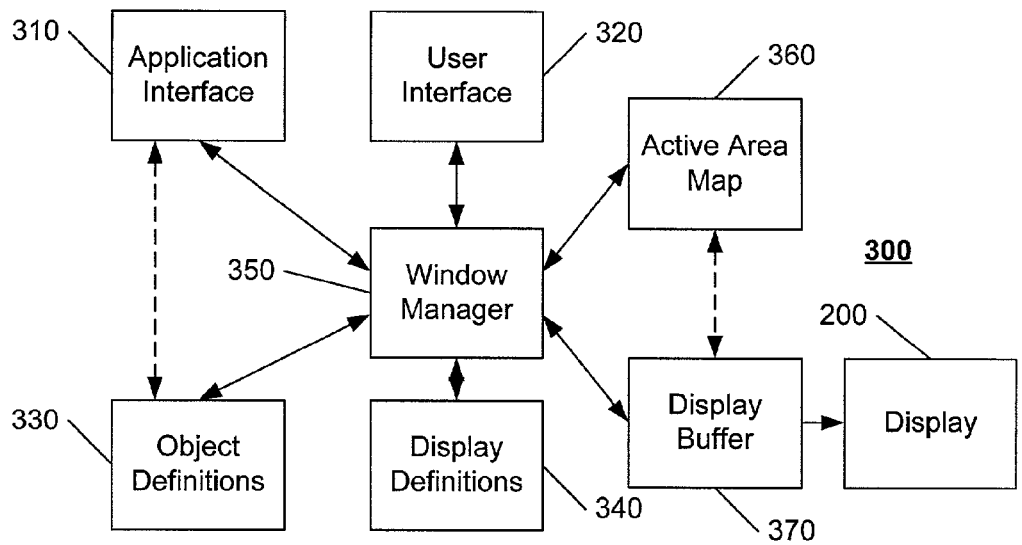
FIG. 3 illustrates an example block diagram of a computer system with a dynamically configurable virtual window manager in accordance with this invention.

FIG. 3 illustrates an example block diagram of a computer system 300 with a dynamically configurable virtual window manager 350 in accordance with this invention. The window manager 350 interacts with application programs and with the user of the system, via an applications interface 310, and user interface 320, respectively. The window manager 350 uses the directives provided by these interfaces 310, 320 to manage an active area map 360. In accordance with one aspect of this invention, the active area 100 of FIG. 1 is unbounded. To accommodate a virtually limitless area 100, the active area map 360 is configured to store the locations of objects, tunnels, caverns, and so on, using dynamic coordinates. For example, in a multiword coordinate, a bit in each word can be reserved to designate whether this word is the last word in the coordinate, or whether one or more words forming the coordinate follows. Using object definitions 330 and display definitions 340, the window manager 350 creates a bit-map representation of a select segment of the active area map 360 in a display buffer 370, based upon the current display area 150 of FIG. 1. Preferably, the display buffer 370 is sized to be somewhat larger than the bit-map size of the display area 150, so that a relocation of the display area 150 relative to the active area 100 (i.e. a 'panning' of the active area 100) can be effected quickly. In a preferred embodiment, the window manager 350 is configured to update the display buffer 370 as a 'background task' when the display area 150 is relocated, so that the display buffer 370 continually contains a bit-map representation of a section of the active area 100 that is larger than the display area 150, to continually allow for rapid panning.

The object definitions 330 are either created directly by the application interface 310, or via an interaction of the application and user with the window manager 350. These object definitions include such parameters as the size and shape of each object 120, 130 of FIG. 1, as well as references to other objects, such as bit-map representations of figures or icons used in the object, and links to control processes that are associated with control items contained within the object, such as buttons and selectors. For convenience, the tunnels and caverns of this invention may also be represented as objects in the object definitions 330. The window manager 350 may be configured to render each object directly, or the object may be self-executing, requiring only an instantiation command from the window manager 350, with a target location in the display buffer 370. The display definitions 340 include such parameters as the resolution of the particular display 200, the scale of the display area 150 to the active area 100 and its current location within the active area 100, and so on, as is common in the art.

Any of a variety of methods and tools can be provided to the user for dynamically configuring the active area 100 of FIG. 1, and in particular for carving out regions of the active area for placing objects. In a straightforward embodiment, the user is provided a 'drawing tool' and merely draws a desired layout of tunnels and caverns. In a preferred embodiment, the creation of tunnels and caverns is integral with conventional windows management operations, such as the movement of windows and icons within the display area, and does not require a separate 'tunnel building' task.

Figure 4:
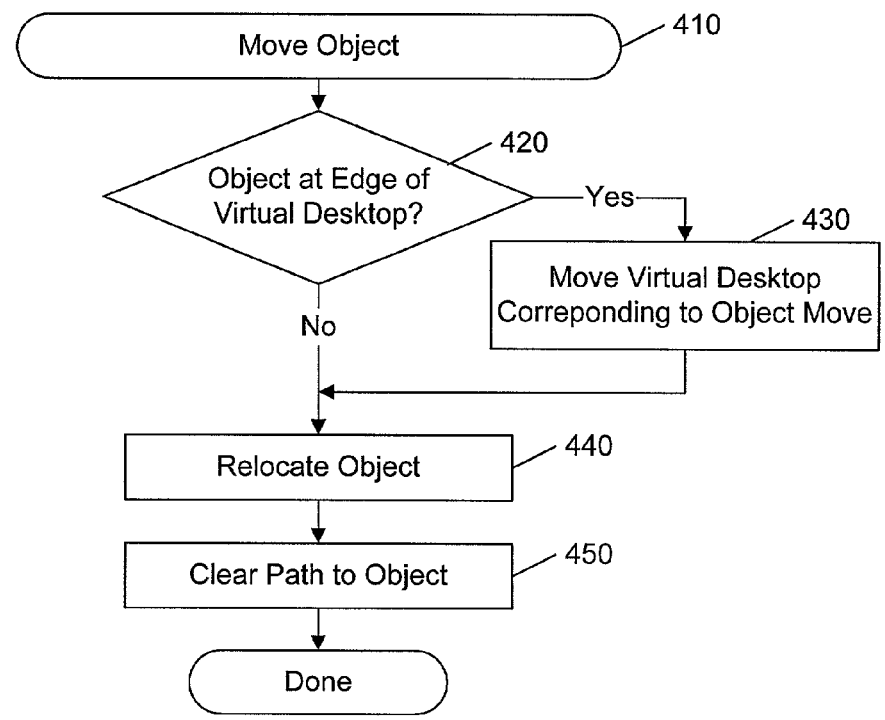
FIG. 4 illustrates an example flow diagram for carving out a region in an active area of a dynamically configurable virtual window manager in accordance with this invention.

FIG. 4 illustrates an example flow diagram of one method for automatically carving out a region in an active area of a dynamically configurable virtual window manager in accordance with this invention. When the user, or application, calls for a movement of an object, at 410, the window manager determines whether the object is at the edge of the current display area, at 420. If the object is at the edge of the display area, the display area is moved relative to the active area, at 430, allowing the object to be moved within the display area. As noted above, a display buffer (370 in FIG. 3) is preferably provided that is larger than the corresponding display area, and therefore this movement of the display area can be effected quickly.

At 440, the object is moved. Both the active area map 360 and the display buffer 370 are updated to reflect this relocation. At 450, a path is cleared to the object, as required. As noted above, in a preferred embodiment, the active area map comprises the location of each tunnel and cavern, and for convenience, the tunnels and caverns may be represented as objects in the object definitions 330 of FIG. 3.

In a preferred embodiment, a tunnel object comprises an identification of the path, or shape, of the tunnel, via a sequence of coordinates relative to a start of the tunnel, and one or more widths associated with this sequence. When an object is first moved into an as-yet-uncleared area 105 of FIG. 1 of the active area 100, a new tunnel is started; as the object is moved, a sequence of coordinates is created corresponding to the movement. When the object is placed at its intended destination, or when it reenters an existing tunnel, the sequence of coordinates is preferably 'smoothed', using conventional line-smoothing techniques, to minimize the number of coordinates required to represent the path of the tunnel, and to minimize 'jagged' paths. This reduced number of coordinates is stored as the path of the tunnel in the instantiated tunnel object. As noted above, access rights can be assigned to each tunnel. In a straightforward embodiment, the user is provided the option of assigning a password to each tunnel, and thereafter access to the tunnel is granted only by providing the proper password. In an alternative embodiment, the direction of the tunnel is used to control access, wherein, for example, each user has an associated 'skill level' for climbing 'up' a tunnel, or each user has a 'life line' that limits how far into a tunnel the user can travel, different users having different length lines. Other access control schemes will be evident to one of ordinary skill in the art in view of this disclosure, such as limiting navigation through a tunnel based on its diameter, limiting removal of objects from a cavern based on the diameter of the connecting tunnel, and so on.

A cavern can be represented in the same manner as a tunnel, or, for ease of processing, a cavern in a preferred embodiment is represented as a circular region, or as an elliptical region with a fixed aspect ratio (ellipticity). In this manner, only a location and radius parameter need be stored for each instantiated cavern object. In a preferred embodiment, a parameter is provided for the default width of tunnels, and the width of each cavern is automatically determined to be as large as required to contain the objects placed in the cavern. Access rights can be assigned to each cavern, limiting access to all of the objects placed within the cavern.

Note that, because the active area in a preferred embodiment of this invention is unbounded, the flow diagram of FIG. 4 is not encumbered with bounds-checks, truncations, and the like, as would be typical of an object-moving process in a conventional windows management system.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A computer system comprising:
   a display buffer that is configured to facilitate a rendering of a display area to a display device, and
   a window manager, coupled to the display buffer, having an active area and is configured to:
   present a visual representation of a subset of the active area, wherein the subset of the active area is visually represented as a plurality of passageways that facilitate navigation and access to objects of the window manager,
   provide one or more tools to facilitate receipt of user input for modifying the plurality of passageways, and
   modify the visual representation of the subset of the active area corresponding to the user input.

2. The computer system of claim 1, wherein
   the active area is arbitrarily shaped.

3. The computer system of claim 1, wherein
   the active area includes
   one or more connected regions that facilitate navigation and access to the objects, via a relocation of the display area relative to the active area.

4. The computer system of claim 3, wherein
   the active area further includes
   one or more blocking regions that limit the navigation and access to the objects.

5. The computer system of claim 4, wherein
   the one or more connected regions are illustrated in the display area as passageways through the one or more blocking regions.

6. The computer system of claim 5, wherein
   the user input for dynamic reconfiguration of the active area includes a modification of the passageways.

7. The computer system of claim 6, wherein
   the modification of the passageways is effected via a movement of one of the objects into the one or more blocking regions.

8. The computer system of claim 3, wherein
   access to one or more regions of the connected regions is selectively controlled.

9. The computer system of claim 8, wherein
   the access is selectively controlled based on at least one of:
   a size of the region,
   a portal to the region,
   a shape of the region, and
   an orientation of the region.

10. The computer system of claim 1, wherein
the window manager is further configured to provide a representation of a larger portion of the active area to the display buffer, to facilitate movement of the display area relative to the active area.

11. A user interface to a windows management system, comprising
a visual representation of a display area that is a subset of an active area of the windows management system, wherein
the subset of the active area is represented as a plurality of passageways that facilitate navigation and access to objects of the windows management system which is configured to:
provide one or more tools to facilitate receipt of user input for modifying the plurality of passageways, and
modify a visual representation of the subset of the active area corresponding to the user input.

12. The user interface of claim 11, wherein
the subset of the active area is further represented as including one or more blocking regions that limit the navigation and access to the objects.

13. The user interface of claim 11, wherein
the one or more tools include:
a drawing tool, and
an object-moving tool.

14. The user interface of claim 11, wherein
at least one of the plurality of passageways includes an associated access-control parameter that limits the navigation and access to the objects within the active area.

15. The user interface of claim 14, wherein
the access-control parameter is based on at least one of:
a size of the one or more passageways,
a portal to the one or more passageways,
a shape of the one or more passageways, and
an orientation of the one or more passageways.

16. A method for dynamically configuring an active area of a windows management system, comprising:
presenting a visual representation of a subset of the active area, wherein the subset of the active area is visually represented as a plurality of passageways that facilitate navigation and access to objects of the windows management system, and
providing one or more tools to facilitate receipt of user input for modifying the plurality of passageways, and
modifying the visual representation of the subset of the active area corresponding to the user input.

17. The method of claim 16, wherein
the one or more tools include:
a drawing tool, and
an object-moving tool.

18. The method of claim 16, further including
selectively preventing user access to the one or more tools for modifying the plurality of passageways.

19. The method of claim 16, further including
limiting navigation and access to the objects, based on characteristics associated with the plurality of passageways.

20. A windows management system, comprising:
a user interface, and
a window manager, couple to the user interface, that is configured to:
present a visual representation of a subset of an active area, wherein the subset of the active area is visually represented as a plurality of passageways that facilitate navigation and access to objects of the window manager,
provide one or more tools to facilitate receipt of user input for modifying the plurality of passageways, and
modify the visual representation of the subset of the active area corresponding to the user input.

21. The windows management system of claim 20, wherein
the window manager is further configured to provide a mapping between the active area map and a display area corresponding to a subset of the active area map to produce a bit-map image of the display area in a display buffer.

22. The windows management system of claim 21, wherein
the window manager is further configured to provide bit-map images of the objects to the display buffer, based on a set of object definitions.

23. The windows management system of claim 20, wherein
the window manager is further configured to limit subsequent access to the objects, based on the placement of the access passageways.

24. The windows management system of claim 23, wherein
the window manager is further configured to limit subsequent access to the objects, based on at least one of:
a size of the access passageways,
a portal to the access passageways,
a shape of the access passageways, and
an orientation of the access passageways.

* * * * *